(12) United States Patent
Panthera

(10) Patent No.: US 11,702,210 B2
(45) Date of Patent: Jul. 18, 2023

(54) VEHICLES WITH ORIENTATION ASSEMBLIES FOR MAINTAINING A PLATFORM IN A PREDETERMINED POSITION

(71) Applicant: IIXXMMXXI LLC, Vernon, CT (US)

(72) Inventor: Aidan Panthera, Vernon, CT (US)

(73) Assignee: IIXXMMXXI LLC, Vernon, CT (US)

( * ) Notice: Subject to any disclaimer, the term of this patent is extended or adjusted under 35 U.S.C. 154(b) by 107 days.

(21) Appl. No.: 17/369,004

(22) Filed: Jul. 7, 2021

(65) Prior Publication Data

US 2023/0010348 A1 Jan. 12, 2023

(51) Int. Cl.
*B64D 11/06* (2006.01)
*B64C 29/02* (2006.01)
*B25J 5/06* (2006.01)
*G01C 21/18* (2006.01)

(52) U.S. Cl.
CPC ............. *B64D 11/0639* (2014.12); *B25J 5/06* (2013.01); *B64C 29/02* (2013.01); *G01C 21/18* (2013.01)

(58) Field of Classification Search
CPC .......... B64C 29/02; B64C 29/04; B63B 7/085
See application file for complete search history.

(56) References Cited

U.S. PATENT DOCUMENTS

| 4,693,186 A | 9/1987 | Lisa |
| 5,406,858 A | 4/1995 | Brainard |
| 6,669,141 B2 | 12/2003 | Schmidtschaeffer |
| 2010/0066152 A1* | 3/2010 | King ....................... F16C 11/06 403/122 |
| 2018/0334062 A1 | 11/2018 | Park |

FOREIGN PATENT DOCUMENTS

| DE | 102017010996 A1 | 5/2019 |
| WO | 9901329 A1 | 1/1999 |

* cited by examiner

*Primary Examiner* — Richard Green
*Assistant Examiner* — Ashesh Dangol
(74) *Attorney, Agent, or Firm* — Dinsmore & Shohl LLP

(57) ABSTRACT

An orientation assembly includes a platform and a locking assembly engageable with the platform and positionable in a first state in which the platform is permitted to rotate about a lateral axis and inhibited from rotating about a longitudinal axis perpendicular to the lateral axis, and a second state in which the platform is permitted to rotate about the longitudinal axis and inhibited from rotating about the lateral axis.

20 Claims, 8 Drawing Sheets

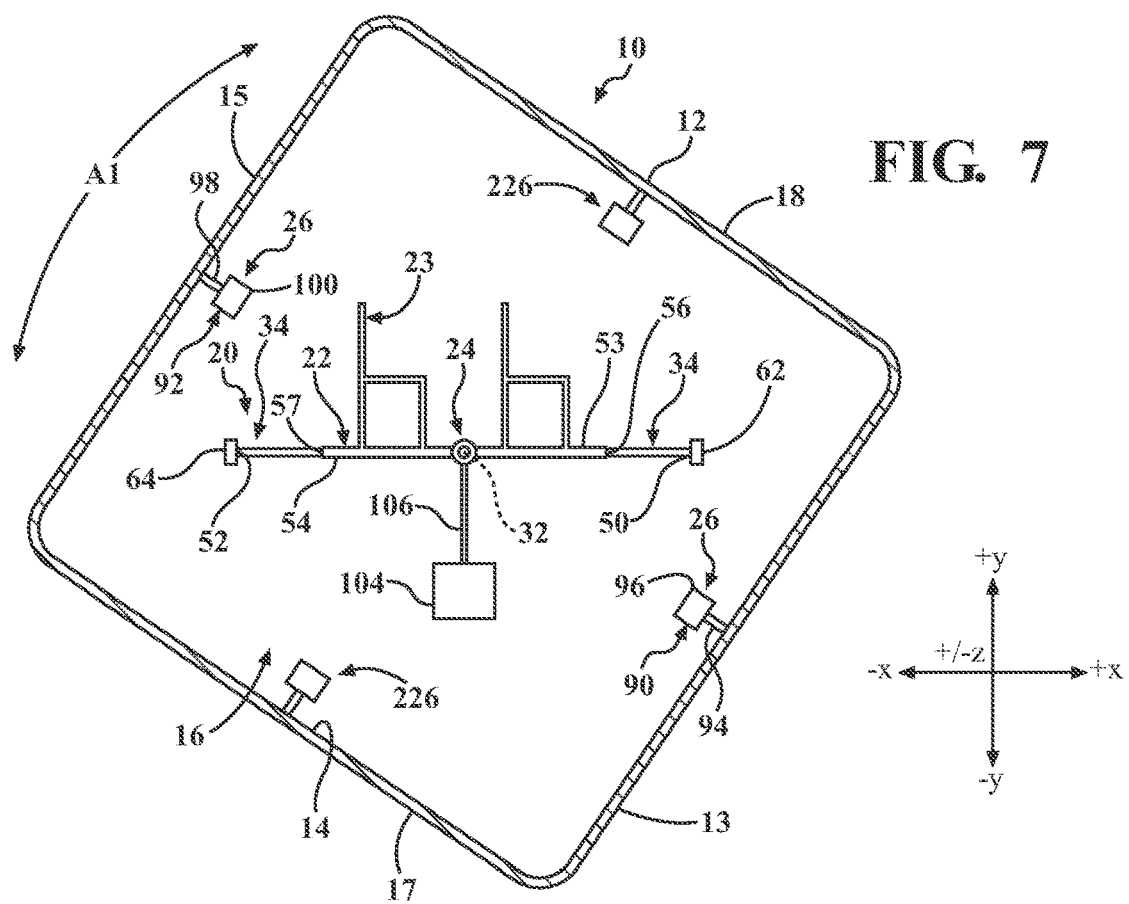
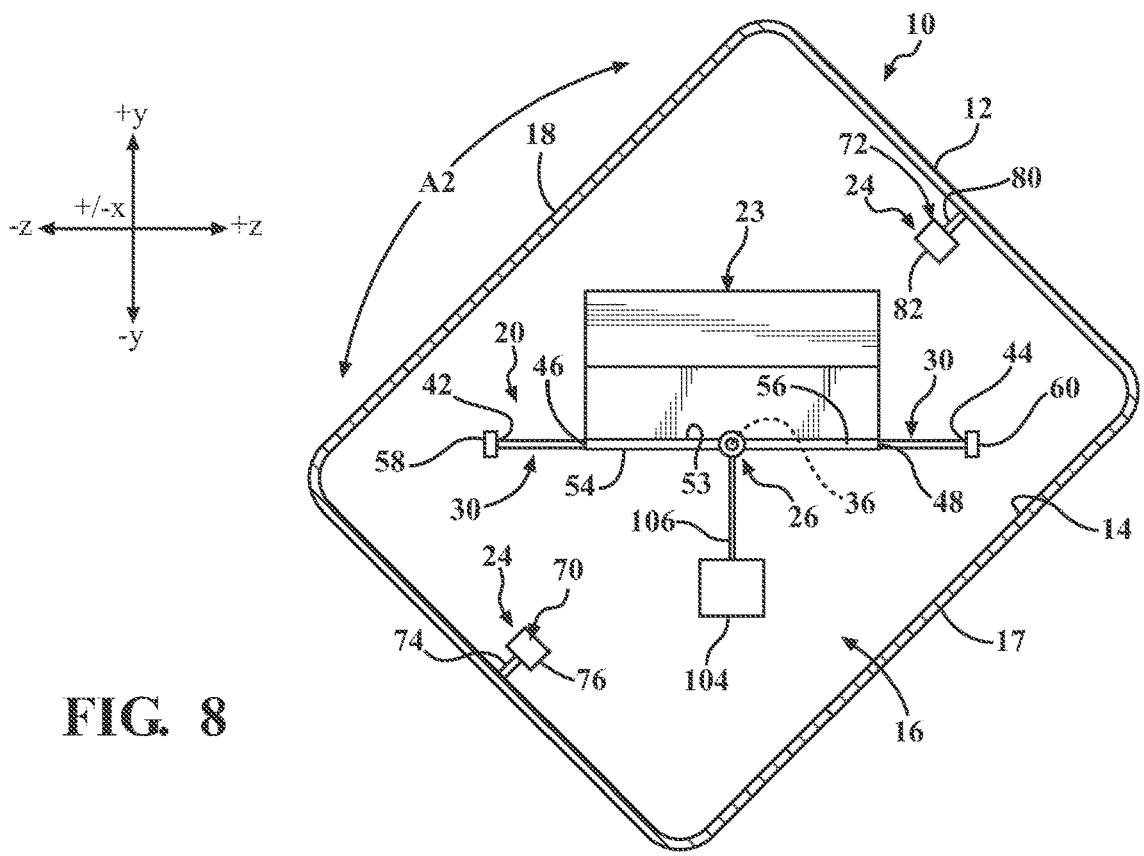

VEHICLES WITH ORIENTATION ASSEMBLIES FOR MAINTAINING A PLATFORM IN A PREDETERMINED POSITION

TECHNICAL FIELD

The present specification generally relates to vehicles with orientation assemblies and, more specifically, vehicles with orientation assemblies for maintaining a seat or platform in a horizontal position relative to a body of the vehicle.

BACKGROUND

While in use, vehicles often experience roll and pitch movements that cause an undesirable effect on seated passengers and cargo. Specifically, tail-sitter aircrafts are aircrafts that take off in a vertical direction from a position in which the aircraft is oriented in a vertical or upright position such that the aircraft is sitting on the tail of the aircraft. These aircraft include seats or cargo platforms that have a fixed orientation relative to a direction of travel of the aircraft. This may cause discomfort or shifting of passengers or cargo during take-off as the passengers and cargo change orientation with the aircraft when transitioning from a vertical flight or take off/landing position to a horizontal flight position.

SUMMARY

In one embodiment, an orientation assembly includes a platform and a locking assembly engageable with the platform and positionable in a first state in which the platform is permitted to rotate about a lateral axis and inhibited from rotating about a longitudinal axis perpendicular to the lateral axis, and a second state in which the platform is permitted to rotate about the longitudinal axis and inhibited from rotating about the lateral axis.

In another embodiment, an orientation assembly includes a platform, a locking assembly engageable with the platform and positionable in a first state in which the platform is permitted to rotate about a lateral axis and inhibited from rotating about a longitudinal axis perpendicular to the lateral axis, and a second state in which the platform is permitted to rotate about the longitudinal axis and inhibited from rotating about the lateral axis, a sensor for detecting a first scenario in which a vehicle is in a vertical flight position, and a second scenario in which the vehicle is in a horizontal flight position, and a controller configured to, in response to the sensor detecting the first scenario, position the locking assembly into the first state, and in response to the sensor detecting the second scenario, position the locking assembly into the second state.

In yet another embodiment, a vehicle includes a vehicle body defining an interior compartment, a platform provided within the interior compartment of the vehicle body, the platform including a lateral shaft defining a lateral axis about which the platform rotates relative to the vehicle body, and a longitudinal shaft defining a longitudinal axis about which the platform rotates relative to the vehicle body, the longitudinal axis being perpendicular to the lateral axis, a lateral locking mechanism coupled to the vehicle body and positionable between an engaged position and a disengaged position, the lateral locking mechanism engaging the lateral shaft when in the engaged position, and disengaging the lateral shaft when in the disengaged position, and a longitudinal locking mechanism coupled to the vehicle body and positionable between an engaged position and a disengaged position, the longitudinal locking mechanism engaging the longitudinal shaft when in the engaged position, and disengaging the longitudinal shaft when in the disengaged position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 7 schematically depicts a partial cross-sectional side view of the vehicle taken along line 7-7 including the orientation assembly of FIG. 1 in the vertical flight configuration, according to one or more embodiments shown and described herein;

FIG. 8 schematically depicts a partial cross-sectional front view of the vehicle taken along line 8-8 including the orientation assembly of FIG. 1 in the horizontal flight configuration, according to one or more embodiments shown and described herein;

DETAILED DESCRIPTION

Embodiments described herein are directed to an orientation assembly for a vehicle including a vehicle body defining an interior compartment. The orientation assembly includes a platform positioned within the compartment, a lateral locking mechanism, and a longitudinal locking mechanism. The platform includes a lateral shaft defining a lateral axis, extending in the +/−Z direction, about which the platform rotates, and a longitudinal shaft defining a longitudinal axis, extending in the +/−X direction, about which the platform rotates. Accordingly, the lateral locking mechanism restricts rotation of the platform about the lateral axis and the longitudinal locking mechanism restricts rotation of the platform about the longitudinal axis. The lateral locking mechanism and the longitudinal locking mechanism may be engaged and disengaged based on an orientation or operation mode, e.g., vertical operation or horizontal operation, of the vehicle.

As used herein, the term "longitudinal direction" refers to the forward-rearward direction of the platform extending in the +/−X direction depicted in the coordinate axes of the drawings, regardless of the orientation of the vehicle. The forward direction is a direction in which an occupant is facing when seated on the platform. The term "lateral direction" refers to the cross-direction or platform width direction extending in the +/−Z direction depicted in the coordinate axes of the drawings, and is transverse to the longitudinal direction. The term "vertical direction" refers to the upward-downward direction of the platform extending in the +/−Y direction depicted in the coordinate axis of the drawings.

Figure 1:
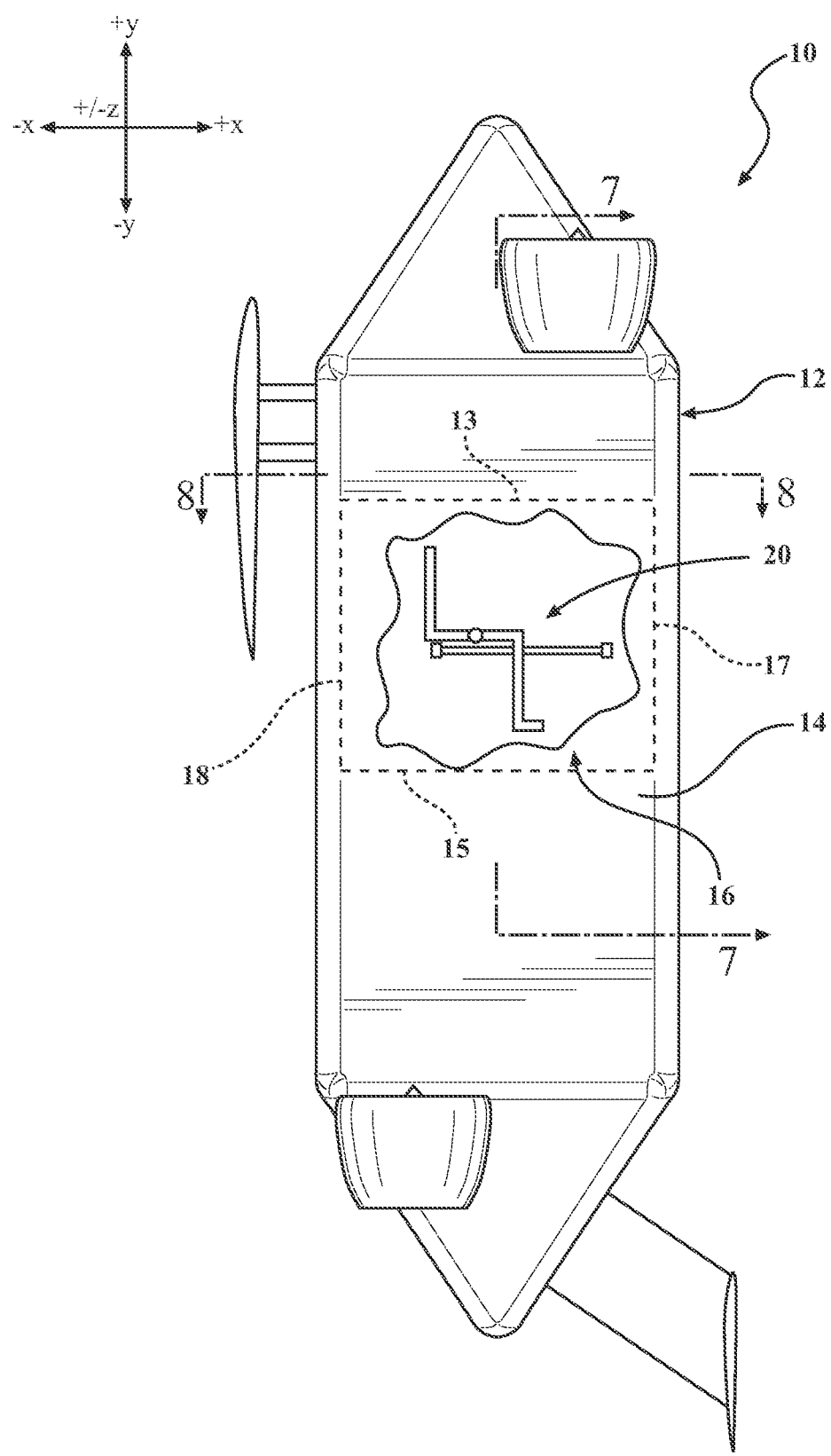
FIG. 1 schematically depicts a side view of a vehicle in a vertical flight position with a portion of a frame removed to show an orientation assembly positioned within the vehicle, according to one or more embodiments shown and described herein.
Figure 2:
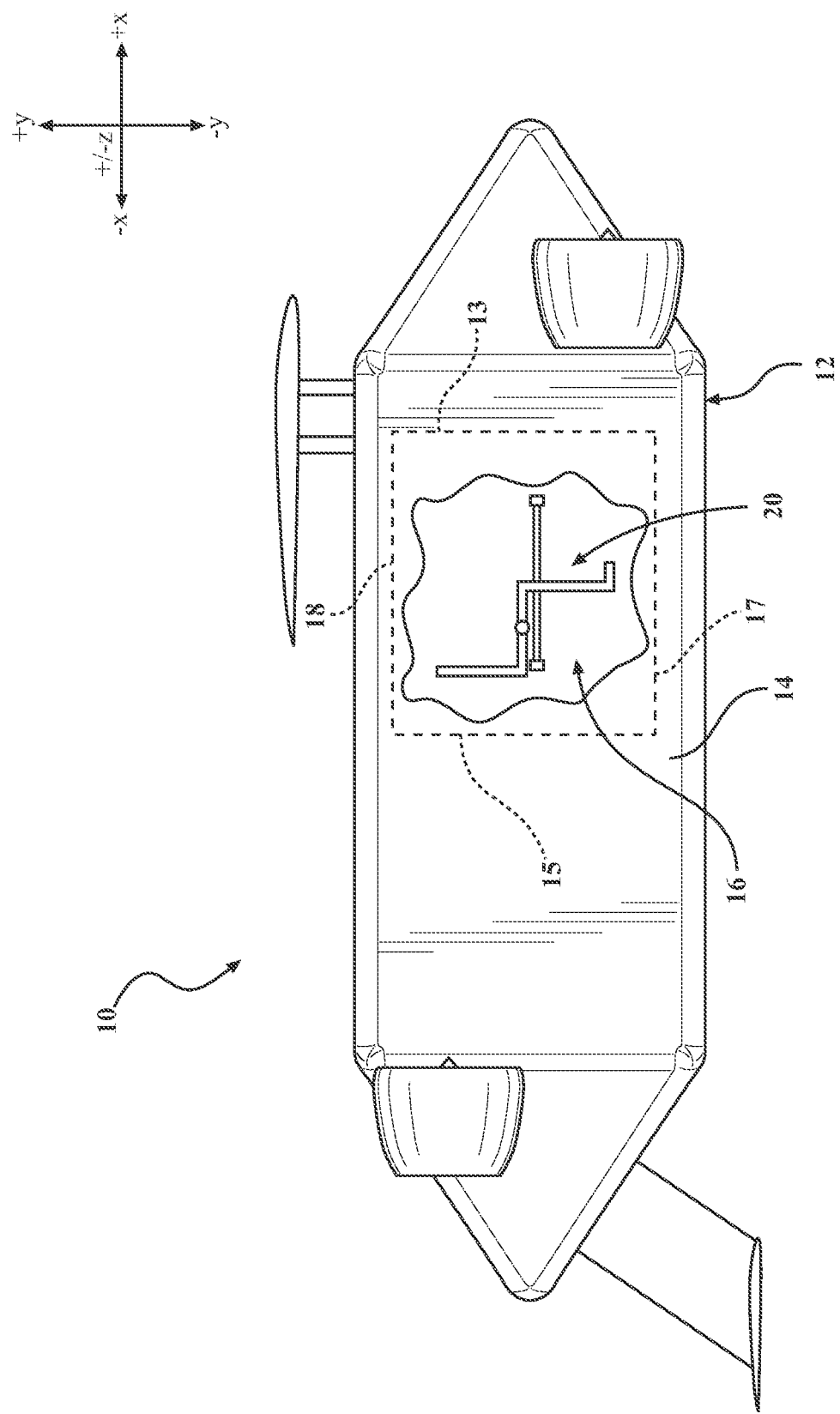
FIG. 2 schematically depicts a side view of the vehicle of FIG. 1 in a horizontal flight position, according to one or more embodiments shown and described herein.

Referring now to FIGS. 1 and 2, a vehicle 10 including an orientation assembly 20 is depicted. The vehicle 10 includes a vehicle body 12 with a frame 14 defining an interior compartment 16. The frame 14 may include a forward wall 13 and a rearward wall 15 opposite the forward wall 13. The orientation assembly 20 may be housed within the interior compartment 16 of the vehicle 10. The vehicle 10 may be a road-operated vehicle, such as a car, a motorcycle, a bicycle, rail transport, etc., a water-operated vehicle, such as a submarine, a boat, etc., an aircraft, such as, a tail-sitter aircraft, vertical take-off and landing (VTOL) aircraft, a commercial airplane, a small passenger plane, etc., or spacecraft, such as a launch vehicle, a rocket, etc. Throughout the ensuing description, the vehicle 10 may be referred to as an aircraft and, specifically, a tail-sitter aircraft. However, this is not intended to be limiting to the present disclosure.

The vehicle 10 may travel in both a vertical orientation (FIG. 1) and a horizontal orientation (FIG. 2). Referring to FIG. 1, in the vertical orientation, the vehicle 10 may be performing a vertical flight operation, such as a take-off operation or a landing operation. While performing the vertical flight operation, the vehicle 10 may travel in a substantially vertical direction (e.g., in the +/−Y direction). Referring to FIG. 2, in the horizontal orientation, the vehicle 10 may be performing a horizontal flight operation. While performing the horizontal flight operation, the vehicle 10 may travel in a substantially horizontal direction (e.g., in the +/−X direction).

Figure 3:
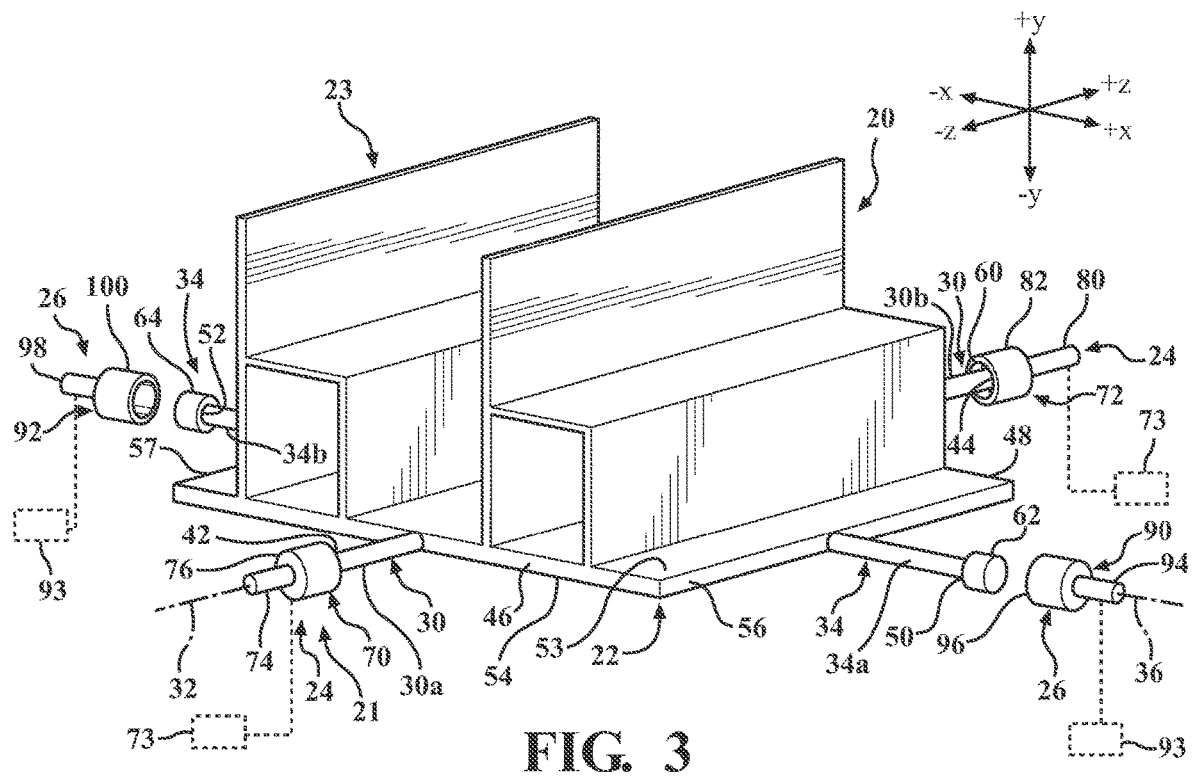
FIG. 3 schematically depicts a perspective view of the orientation assembly of FIG. 1 in a vertical flight configuration, according to one or more embodiments shown and described herein.
Figure 4:
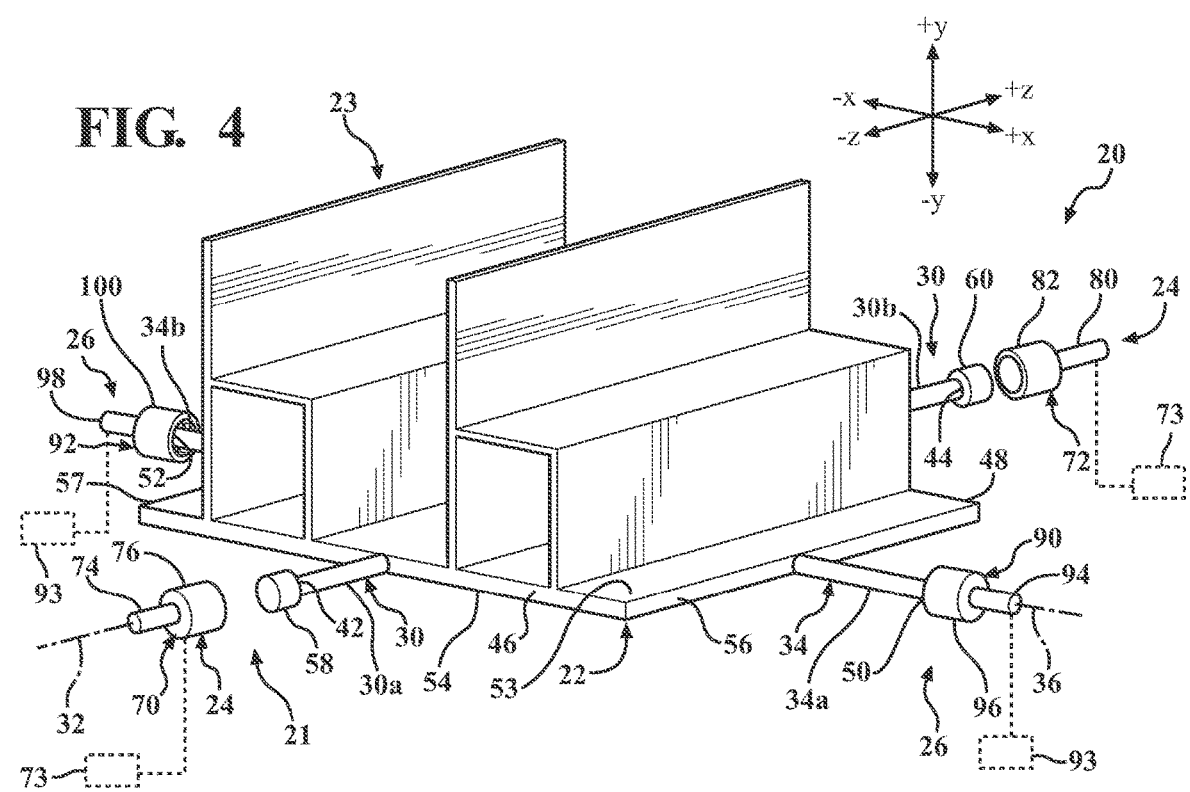
FIG. 4 schematically depicts a perspective view of the orientation assembly of FIG. 1 in a horizontal flight configuration, according to one or more embodiments shown and described herein.

Referring to FIGS. 3 and 4, in embodiments, the orientation assembly 20 may include a platform 22, at least one seat 23 provided on the platform 22, a locking assembly 21, and a controller 28 (FIG. 15) configured to control operation of the locking assembly 21. However, in embodiments, the orientation assembly 20 may not include a seat 23, such that the platform 22 may be used primarily for transporting cargo. In embodiments, the locking assembly 21 includes a lateral locking mechanism 24 and a longitudinal locking mechanism 26. As discussed in more detail herein, the locking assembly 21 is positionable in a first state, a second state, and a third state. When the locking assembly 21 is in the first state, the lateral locking mechanism 24 is in an engaged position and the longitudinal locking mechanism 26 is in a disengaged position such that the platform 22 is permitted to rotate about a lateral axis 32 and inhibited from rotating about a longitudinal axis 36. When the locking assembly 21 is in the second state, the lateral locking mechanism 24 is in a disengaged position and the longitudinal locking mechanism 26 is in an engaged position such that the platform 22 is permitted to rotate about the longitudinal axis 36 and inhibited from rotating about the lateral axis 32. When the locking assembly 21 is in the third state, the lateral locking mechanism 24 is in the engaged position and the longitudinal locking mechanism 26 is in the engaged position such that the platform 22 is inhibited from rotating about both the lateral axis 32 and the longitudinal axis 36.

The platform 22 may include a first side edge 46, an opposite second side edge 48, a front side 56, an opposite rear side 57, an upper surface 53, an opposite lower surface 54, a lateral shaft 30, and a longitudinal shaft 34. The lateral shaft 30 defines a lateral axis 32 extending in the +/−Z direction when the vehicle 10 is in both the vertical flight operation and the horizontal flight operation. The lateral shaft 30 may extend from the first side edge 46 and the second side edge 48 of the platform 22. In embodiments, the lateral shaft 30 may extend through the platform 22. Specifically, the platform 22 may include a bore extending therethrough, with the lateral shaft 30 positioned within the bore in the platform 22. In embodiments, the lateral shaft 30 may be formed with the platform 22. In embodiments, the lateral shaft 30 may be formed as two separate shafts 30a, 30b, with one shaft 30a being coupled to the platform 22 at the first side edge 46 and the other shaft 30b being coupled to the platform 22 at the second side edge 48. The longitudinal shaft 34 defines a longitudinal axis 36 extending in the +/−X direction when the vehicle 10 is in both the vertical flight operation and the horizontal flight operation. In embodiments, the longitudinal shaft 34 may extend through the platform 22. Specifically, the platform 22 may include a bore extending therethrough, with the longitudinal shaft 34 positioned within the bore in the platform 22. In embodiments, the longitudinal shaft 34 may be formed with the platform 22. In embodiments, the longitudinal shaft 34 may be formed as two separate shafts 34a, 34b, with one shaft 34*a* being coupled to the platform 22 at the front side 56 and the other shaft 34*b* being coupled to the platform 22 at the rear side 57.

Referring to FIG. 4, the lateral shaft 30 may include a first end 42, an opposite second end 44, a first bearing 58 coupled to and provided at the first end 42, and a second bearing 60 coupled to and provided at the second end 44. Referring to FIG. 3, the longitudinal shaft 34 may include a front end 50, an opposite rear end 52, a first bearing 62 coupled to and provided at the front end 50, and a second bearing 64 coupled to and provided at the rear end 52. As depicted in FIGS. 3 and 4, each of the bearings 58, 60, 62, 64 are cylindrical in shape. However, in embodiments, each of the bearings 58, 60, 62, 64 may include any suitable shape. The bearings 58, 60, 62, 64 may be rotatably coupled to the corresponding lateral shaft 30 or longitudinal shaft 34 such that the bearing 58, 60, 62, 64 may rotate relative to the shaft. Alternatively, in embodiments where the bearings 58, 60, 62, 64 are cylindrical, each of the bearings 58, 60, 62, 64 may be fixedly coupled to the corresponding lateral shaft 30 or longitudinal shaft 34 such that the bearings 58, 60, 62, 64 rotate with the corresponding lateral shaft 30 or longitudinal shaft 34. Each of the first bearing 58 and second bearing 60 for the lateral shaft 30, and the first bearing 62 and second bearing 64 for the longitudinal shaft 34 may include a plurality of bearings shaped around the ends of the lateral shaft 30 and the longitudinal shaft 34, respectively. For example, the first bearing 58 may include a plurality of bearings shaped around the first end 42 of the lateral shaft 30.

The seat 23 may be coupled to the upper surface 53 of the platform 22. While the seat 23 is depicted herein as a bench seat, the seat 23 may be a "50/50" seat, a "60/40" seat, a captain type seat, a bucket type seat, a bench type seat, or any other seat. The at least one seat 23 may include any number of rows of seats extending in the +/−X direction, such as one, two, three, four, etc. As shown, a pair of rows of seats 23 are illustrated. However, more or less than the pair of rows of seats 23 may be provided, such as only one row of seats 23, three rows of seats 23, four rows of seats 23, or the like. Although referred to as a seat 23, the seat 23 may also be configured to store cargo or other items which are intended to remain upright during operation of the vehicle 10. As used herein, the term "horizontal position" refers to a position of the platform 22 in which the platform 22 extends parallel to the X axis and the Z axis of the coordinate axes depicted in the drawings with the upper surface 53 of the platform 22 facing the +Y direction, such that cargo and/or passengers positioned on the platform 22 may remain upright during both vertical flight operations and horizontal flight operations of the vehicle 10.

The lateral locking mechanism 24 may include a first lateral locking member 70, a second lateral locking member 72, and a lateral locking actuator 73. The first lateral locking member 70 may include a piston 74 coupled to the frame 14 of the vehicle body 12 (FIG. 9) and a receiver 76 formed at a free end of the piston 74. The second lateral locking member 72 may include a piston 80 coupled to the frame 14 of the vehicle body 12 (FIG. 9) and a receiver 82 formed at a free end of the piston 80. The piston 74 of the first lateral locking member 70 and the piston 80 of the second lateral locking member 72 may move between a disengaged position (FIG. 4) and an engaged position (FIG. 3). The lateral locking actuator 73 may move the piston 74 and the piston 80 to move the first lateral locking member 70 and the second lateral locking member 72 between the disengaged position and the engaged position. In embodiments, each receiver 76, 82 may be coupled to the lateral shaft 30, and each bearing 58, 60 may be coupled to the piston 74 and the piston 80, respectively.

The lateral locking actuator 73 may be configured to linearly displace a distal end of the piston 74 opposite the free end away from the frame 14. Similarly, the lateral locking actuator 73 may be configured to linearly displace a distal end of the piston 80 opposite the free end away from the frame 14. When moving from the disengaged position to the engaged position, the lateral locking actuator 73 moves the piston 74 and the piston 80 in opposing lateral directions toward one another, and away from a portion of the frame 14 of the vehicle 10 to which the piston 74 and the piston 80 are coupled. Specifically, the lateral locking actuator 73 moves each of the piston 74 and the piston 80 toward the platform 22 to position the first bearing 58 and the second bearing 60 within the receiver 76 and the receiver 82, respectively. The lateral locking actuator 73 may be coupled to the frame 14 and each of the piston 74 and the piston 80, with the lateral locking actuator 73 being positioned between the frame 14 and each of the piston 74 and the piston 80. The lateral locking actuator 73 may transfer motion to each of the piston 74 and the piston 80 through a transfer mechanism, such as a set of gears, pulleys, or the like, so that a single actuator may be used to move both the piston 74 and the piston 80. Alternatively, the lateral locking mechanism 24 may include two lateral locking actuators 73, with one of the lateral locking actuators 73 being coupled to one of the piston 74 and the piston 80, and the other of the lateral locking actuators 73 being coupled to the other of the piston 74 and the piston 80. The lateral locking actuator 73 may be a linear actuator, a rotary actuator, or the like. Additionally, the lateral locking actuator 73 may be a linear actuator, a solenoid, an electric actuator, a hydraulic actuator, a pneumatic actuator, or the like.

Each receiver 76, 82 is configured to receive a corresponding bearing 58, 60. Each receiver 76, 82 has a shape that corresponds to a shape of the corresponding bearing 58, 60 such that the corresponding bearing 58, 60 may be at least partially received within the receiver 76, 82 to allow for rotational movement of the corresponding bearing 58, 60 and, thereby, rotation of the corresponding shaft with respect to the piston. For example, the receiver 76 may be configured to the receive the bearing 58, the receiver 76 being shaped to correspond to a shape of the bearing 58 at the first end 42 of the lateral shaft 30 to allow for the bearing 58 to rotate, and the lateral shaft 30 to rotate with respect to the piston 74.

The longitudinal locking mechanism 26 may include a first longitudinal locking member 90, a second longitudinal locking member 92, and a longitudinal locking actuator 93. The first longitudinal locking member 90 may include a piston 94 coupled to the interior compartment 16 of the vehicle body 12 (FIG. 7) and a receiver 96 formed at a free end of the piston 94. The second longitudinal locking member 92 may include a piston 98 coupled to the interior compartment 16 of the vehicle body 12 (FIG. 7) and a receiver 100 formed at a free end of the piston 98. The piston 94 of the first longitudinal locking member 90 and the piston 98 of the second longitudinal locking member 92 may move between a disengaged position (FIG. 3) and an engaged position (FIG. 4). The longitudinal locking actuator 93 may move the piston 94 and the piston 98 to move the first longitudinal locking member 90 and the second longitudinal locking member 92 between the disengaged position and the engaged position. In embodiments, each receiver may be coupled to the longitudinal shaft 34, and each bearing 62, 64 may be coupled to the piston 94 and the piston 98, respectively.

The longitudinal locking actuator 93 may be configured to linearly displace a distal end of the piston 94 opposite the free end away from the frame 14. Similarly, the longitudinal locking actuator 93 may be configured to linearly displace a distal end of the piston 98 opposite the free end away from the frame 14. When moving from the disengaged position to the engaged position, the longitudinal locking actuator 93 moves the piston 94 and the piston 98 in opposing longitudinal directions toward one another, and away from a portion of the frame 14 of the vehicle 10 to which the piston 94 and the piston 98 are coupled. Specifically, the longitudinal locking actuator 93 moves each of the piston 94 and the piston 98 toward the platform 22 to position the first bearing 62 and the second bearing 64 within the receiver 96 and the receiver 100, respectively. The longitudinal locking actuator 93 may be coupled to the frame 14 and each of the piston 94 and the piston 98, with the longitudinal locking actuator 93 being positioned between the frame 14 and each of the piston 94 and the piston 98. The longitudinal locking actuator 93 may transfer motion to each of the piston 94 and the piston 98 through a transfer mechanism, such as a set of gears, pulleys, or the like, so that a single actuator may be used to move both the piston 94 and the piston 98. Alternatively, the longitudinal locking mechanism 26 may include two longitudinal locking actuators 93, with one of the longitudinal locking actuators 93 being coupled to one of the piston 94 and the piston 98, and the other of the longitudinal locking actuators 93 being coupled to the other of the piston 94 and the piston 98. The longitudinal locking actuator 93 may be a linear actuator, a rotary actuator, or the like. Additionally, the longitudinal locking actuator 93 may be a linear actuator, a solenoid, an electric actuator, a hydraulic actuator, a pneumatic actuator, or the like.

Each receiver 96, 100 is configured to receive a corresponding bearing 62, 64. Each receiver 96, 100 has a shape that corresponds to a shape of the corresponding bearing 62, 64 such that the corresponding bearing 62, 64 may be at least partially received within the receiver 96, 100 to allow for rotational movement of the corresponding bearing 62, 64 and, thereby, rotation of the corresponding shaft with respect to the piston. For example, the receiver 96 may be configured to the receive the bearing 62, the receiver 96 being shaped to correspond to a shape of the bearing 62 at the front end 50 of the longitudinal shaft 34 to allow for the bearing 62 to rotate, and the longitudinal shaft 34 to rotate with respect to the piston 94.

Referring to FIG. 3, the orientation assembly 20 is depicted in a vertical flight configuration. As described in more detail herein, the orientation assembly 20 is in the vertical flight configuration when the vehicle 10 is performing a vertical flight operation, such as take-off or landing. In the vertical flight configuration, the lateral locking mechanism 24 is in the engaged position and the longitudinal locking mechanism 26 is in the disengaged position. When the lateral locking mechanism 24 is in the engaged position, the piston 74 of the first lateral locking member 70 and the piston 80 of the second lateral locking member 72 are extended toward the platform 22 relative to the vehicle body 12. When in the engaged position, the first bearing 58 and the first end 42 of the lateral shaft 30 are received within and engage the receiver 76 of the first lateral locking member 70, thereby engaging the lateral shaft 30 with the first lateral locking member 70. When positioned within the receiver 76, the first bearing 58 may permit the lateral shaft 30 to rotate relative to the receiver 76. Specifically, in embodiments where the first bearing 58 is rotatably coupled to the lateral shaft 30, the first bearing 58 may be press-fit into the receiver 76 to restrict rotation of the first bearing 58, while permitting rotation of the lateral shaft 30 relative to the receiver 76. In embodiments where the first bearing 58 is fixedly coupled to the lateral shaft 30, the first bearing 58 may be received within the receiver 76 such that the first bearing 58 may rotate within the receiver 76. Similarly, the second bearing 60 and the second end 44 of the lateral shaft 30 are received within and engage the receiver 82 of the second lateral locking member 72, thereby engaging the lateral shaft 30 with the second lateral locking member 72. The second bearing 60 may be positioned within the receiver 82 similar to the first bearing 58 and the receiver 76, as described above. When the longitudinal locking mechanism 26 is in the disengaged position, the piston 94 of the first longitudinal locking member 90 and the piston 98 of the second longitudinal locking member 92 are retracted away from the platform 22 relative to the vehicle body 12, with the longitudinal shaft 34 disengaging the receivers 96, 100. When in the vertical flight configuration with the lateral locking mechanism 24 in the engaged position and the longitudinal locking mechanism 26 in the disengaged position, the platform 22 is permitted to rotate about the lateral axis 32 to maintain the platform 22 in the horizontal position with the seat 23 upright.

Referring to FIG. 4, the orientation assembly 20 is depicted in a horizontal flight configuration. As described in more detail herein, the orientation assembly 20 is in the horizontal flight configuration when the vehicle 10 is performing a horizontal flight operation, such as after completing take off or prior to preparing for landing. In the horizontal flight configuration, the lateral locking mechanism 24 is in the disengaged position and the longitudinal locking mechanism 26 is in the engaged position. When the lateral locking mechanism 24 is in the disengaged position, the piston 74 of the first lateral locking member 70 and the piston 80 of the second lateral locking member 72 are retracted away from the platform 22 relative to the vehicle body 12, with the lateral shaft 30 disengaging the receivers 76, 82. When the longitudinal locking mechanism 26 is in the engaged position, the piston 94 of the first longitudinal locking member 90 and the piston 98 of the second longitudinal locking member 92 are extended toward the platform 22 relative to the vehicle body 12. When in the engaged position, the first bearing 62 and the front end 50 of the longitudinal shaft 34 are received within and engage the receiver 96 of the first longitudinal locking member 90, thereby engaging the longitudinal shaft 34 with the first longitudinal locking member 90. When positioned within the receiver 96, the first bearing 62 may permit the longitudinal shaft 34 to rotate relative to the receiver 96. Specifically, in embodiments where the first bearing 62 is rotatably coupled to the longitudinal shaft 34, the first bearing 62 may be press-fit into the receiver 96 to restrict rotation of the first bearing 62, while permitting rotation of the longitudinal shaft 34 relative to the receiver 96. In embodiments where the first bearing 62 is fixedly coupled to the longitudinal shaft 34, the first bearing 62 may be received within the receiver 96 such that the first bearing 62 may rotate within the receiver 96.

Similarly, the second bearing 64 and the rear end 52 of the longitudinal shaft 34 are received within and engage the receiver 100 of the second longitudinal locking member 92, thereby engaging the longitudinal shaft 34 with the second longitudinal locking member 92. The second bearing 64 may be positioned within the receiver 100 similar to the first bearing 62 and the receiver 96, as described above. When in the horizontal flight configuration with the lateral locking mechanism 24 in the disengaged position and the longitudinal locking mechanism 26 in the engaged position, the platform 22 is permitted to rotate about the longitudinal axis 36 to maintain the platform 22 in the horizontal position with the seat 23 upright.

Figure 5:
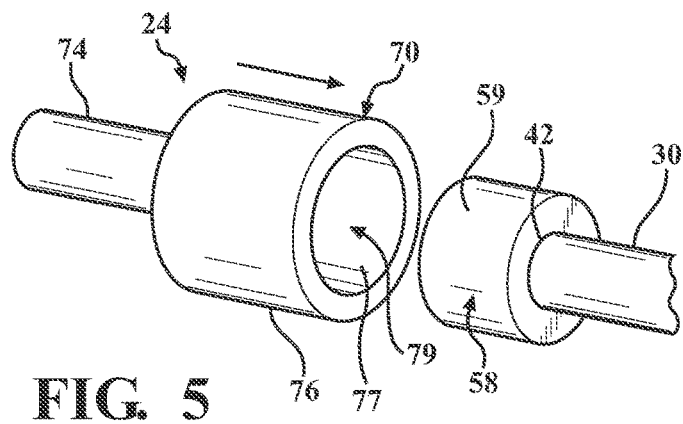
FIG. 5 schematically depicts a perspective view of a locking mechanism of the orientation assembly of FIG. 1 in a disengaged position, according to one or more embodiments shown and described herein.
Figure 6:
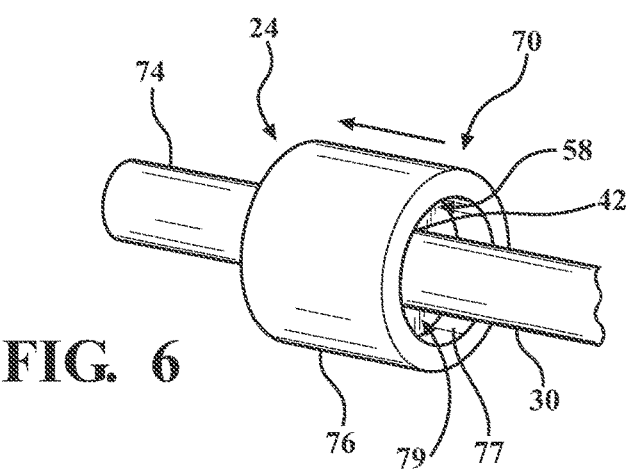
FIG. 6 schematically depicts a perspective view of the locking mechanism of FIG. 5 in an engaged position, according to one or more embodiments shown and described herein.

Referring now to FIGS. 5 and 6, the lateral locking mechanism 24 is depicted moving between the disengaged position (FIG. 5) and the engaged position (FIG. 6). However, it should be appreciated that operation of the lateral locking mechanism 24 is equally applicable to operation of the longitudinal locking mechanism 26. The receiver 76 includes an interior surface 77 defining a receiving bore 79. The receiving bore 79 is sized and shaped to receive the first bearing 58 of the lateral shaft 30. An outer surface 59 of the first bearing 58 may contact the interior surface 77 when the first bearing 58 is positioned within the receiving bore 79, e.g., in the engaged position. While FIGS. 5 and 6 depict the receiver 76 and the first bearing 58, the above discussion of the receiver 76 and the first bearing 58 is equally applicable to the other receivers 76, 82, 96, 100 and bearings 58, 60, 62, 64 of the lateral shaft 30 and the longitudinal shaft 34.

Referring now to FIG. 7, the orientation assembly 20 may further include a counterweight 104. The counterweight 104 may be coupled to a lower surface 54 of the platform 22 opposite the upper surface 53, such that the platform 22 is positioned between the seat 23 and the counterweight 104. The counterweight 104 may be coupled to the platform 22 via a rod 106. The rod 106 may be a telescoping rod, such that the length of the rod 106 may be adjustable to adjust the distance between the platform 22 and the counterweight 104. The counterweight 104 is configured to maintain the platform 22 in the horizontal position with the seat 23 upright when the orientation assembly 20 is in either the vertical flight configuration or the horizontal flight configuration. In the horizontal position, the seat 23 is configured to be positioned above the platform 22 in the vertical direction (e.g., in the +Y direction), regardless of the orientation of the vehicle 10. The counterweight 104 may have a weight that is equal to or greater than a total weight of a plurality of occupants or cargo positioned on the seat 23. In embodiments, the counterweight 104 may be movably coupled to a track positioned on the platform 22, such that the counterweight 104 may be repositioned relative to the platform 22 in the lateral direction, the longitudinal direction, or both. The counterweight 104 may be coupled to the track via the rod 106. The counterweight 104 may be locked in place via a locking mechanism to fix the counterweight 104 relative to the platform 22. In embodiments, an actuator may be coupled to the counterweight 104 to move the counterweight 104 along the track.

Referring still to FIG. 7, the orientation assembly 20 is depicted in the vertical flight configuration, with the lateral locking mechanism 24 in the engaged position and the longitudinal locking mechanism 26 in the disengaged position. When in the vertical flight configuration, the platform 22 may rotate about the lateral axis 32 (FIG. 3) with the lateral shaft 30 engaged with the lateral locking mechanism 24. The vehicle body 12 may change pitch, or rotate in the direction of arrow A1, such as when the vehicle 10 is in a vertical takeoff or landing trajectory. During vehicle rotation, the counterweight 104 may balance the platform 22, maintaining the platform 22 in the horizontal position, such that an occupant positioned on the seat 23 may remain in an upright seated position during pitch rotation of the vehicle 10. In embodiments, a pair of secondary longitudinal locking mechanisms 226 may be provided to extend from a lower wall 17 and an upper wall 18 of the frame 14. The lower wall 17 and the upper wall 18 extend between the forward wall 13 and the rearward wall 15. It should be appreciated that the pair of secondary longitudinal locking mechanisms 226 include the same structure as the longitudinal locking mechanisms 26. Thus, the platform 22 may be locked in the horizontal position to inhibit rotation about the lateral axis 32 when the vehicle 10 is in the vertical flight position.

Referring now to FIG. 8, the orientation assembly 20 is depicted in the horizontal flight configuration, with the lateral locking mechanism 24 in the disengaged position and the longitudinal locking mechanism 26 in the engaged position. When in the horizontal flight configuration, the platform 22 may rotate about the longitudinal axis 36 with the longitudinal shaft 34 engaged with the longitudinal locking mechanism 26. The vehicle body 12 may change a roll angle, or rotate in the direction of arrow A2, such as when the vehicle 10 is in a horizontal flight orientation. During vehicle roll, the counterweight 104 may balance the platform 22, maintaining the platform 22 in the horizontal position. As discussed in more detail herein, once the vehicle 10 returns to a vertical flight or landing position from the horizontal flight position, the orientation assembly 20 returns to the vertical flight configuration with the lateral locking mechanism 24 in the engaged position and the longitudinal locking mechanism 26 in the disengaged position.

Figure 9:
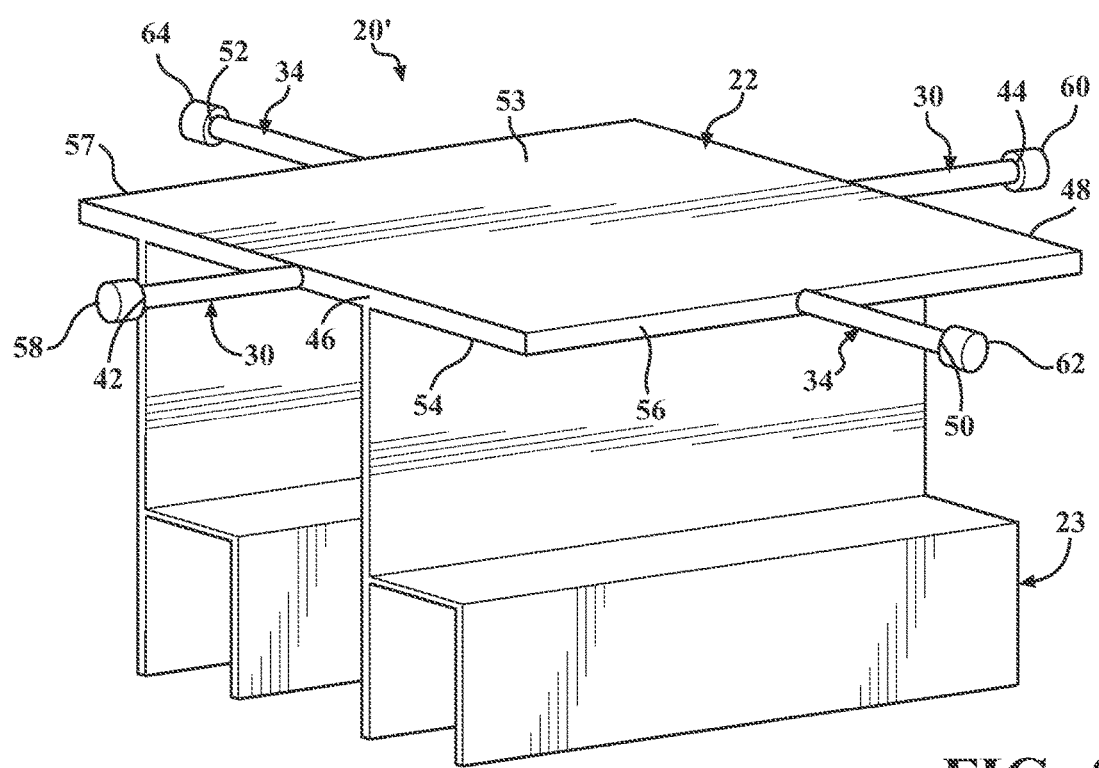
FIG. 9 schematically depicts a perspective view of another embodiment of an orientation assembly, according to one or more embodiments shown and described herein.

Referring now to FIG. 9, an orientation assembly 20' is illustrated. The orientation assembly 20' is similar to the orientation assembly 20 such that like parts are depicted with like reference numbers except that the platform 22 is positioned above the seat 23. Accordingly, such that the seat 23 is coupled to the lower surface 54 of the platform 22 rather than the upper surface 53. The positioning of the seat 23 below the platform 22 uses the weight of the seat 23 and any occupants or cargo positioned on the seat 23 to maintain the platform 22 in the horizontal position with the seat 23 upright. As such, the seat 23 functions as the counterweight to the orientation assembly 20'.

Figure 10:
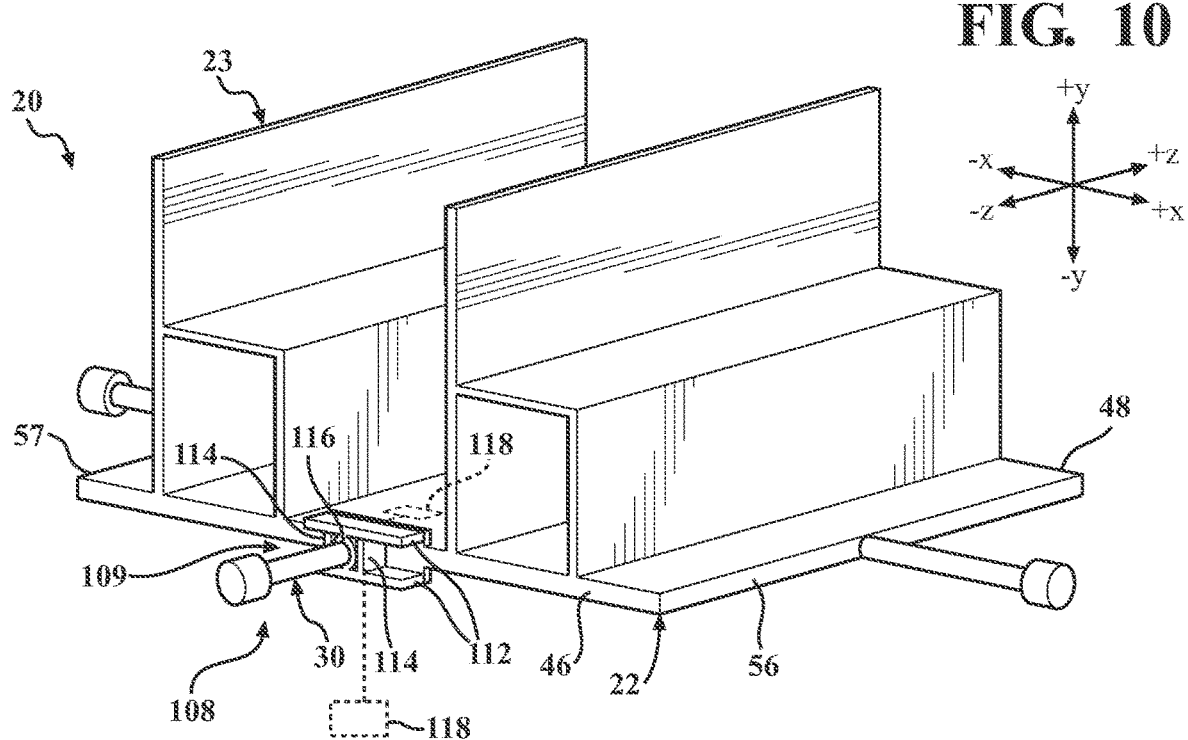
FIG. 10 schematically depicts a perspective view of the orientation assembly of FIG. 1 including a first balancing mechanism, according to one or more embodiments shown and described herein.
Figure 13:
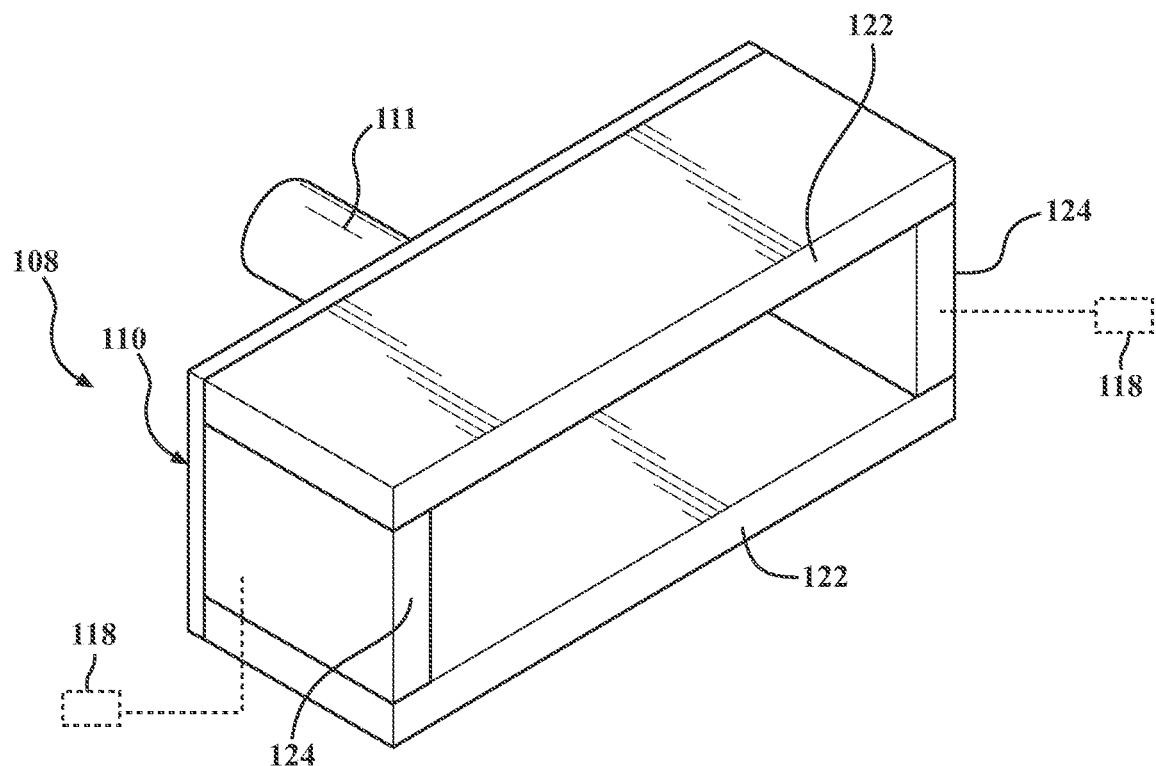
FIG. 13 schematically depicts perspective view of a second balancing mechanism in in an adjustable position, according to one or more embodiments shown and described herein.

Referring now to FIG. 10, in embodiments, the orientation assembly 20 may include a balancing assembly 108 attached to an end of a shaft 111 extending from the frame 14 of the vehicle body 12 (FIG. 13). The balancing assembly 108 may include a first balancing mechanism 109 coupled to the platform 22 and a second balancing mechanism 110 (FIG. 13) coupled to the frame 14 of the vehicle 10. The balancing assembly 108 may be configured to adjust the position of the lateral shaft 30 relative to the platform 22 in the +/−X direction to balance the platform 22 when there is an unequal amount of weight on the platform 22 in front of and behind the lateral shaft 30. In this embodiment, it should be appreciated that the lateral shaft 30 is not permanently fixed to the platform 22. The balancing assembly 108 may move the lateral shaft 30 in the longitudinal direction, i.e., in the +/−X direction. While the first balancing mechanism 109 is depicted on the first side edge 46 of the platform 22, the orientation assembly 20 includes another balancing mechanism on the second side edge 48 engaged with the lateral shaft 30 on the other side of the platform 22. The orientation assembly 20 may further include a plurality of first balancing mechanisms 109 and a plurality of second balancing mechanisms 110 that may be positioned on the front side 56, and/or the rear side 57 to engage the longitudinal shaft 34 similarly to the lateral shaft 30.

Figure 15:
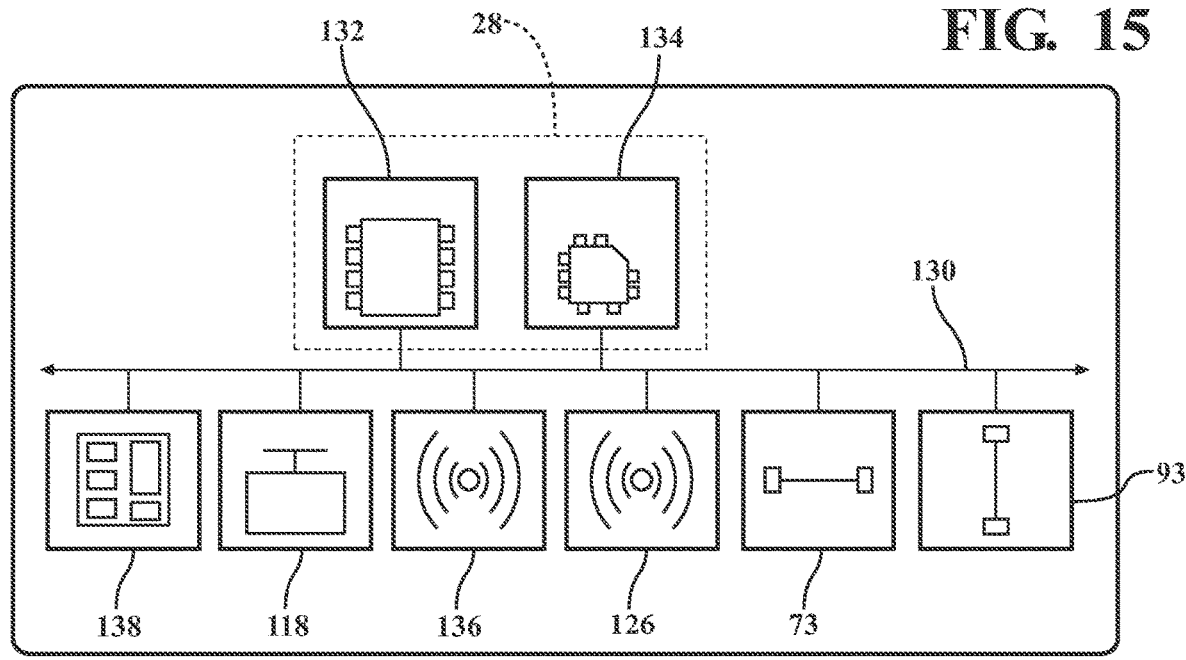
FIG. 15 schematically depicts a controller for controlling operation of the orientation assembly of FIG. 1, according to one or more embodiments shown and described herein.

The first balancing mechanism 109 may include a pair of tracks 112 extending parallel to the longitudinal direction, a pair of adjustable walls 114 extending perpendicular to the pair of tracks 112, a bearing 116 coupled to the lateral shaft 30 between the pair of tracks 112 and the lateral shaft 30, a balancing actuator 118 coupled to the pair of adjustable walls 114, and a sensor 126 (FIG. 15). The pair of adjustable walls 114 may be independently movable relative to each other in the longitudinal direction. However, in embodiments, the adjustable walls 114 may be fixed relative to each other, and may move together relative to the tracks 112. The first balancing mechanism 109 may move between an adjustable position and a locked position. The pair of adjustable walls 114 may be moved via the balancing actuator 118. In embodiments, the lateral shaft 30 may be manually moved without the use of the balancing actuator 118. The sensor 136 may be configured to detect an angular orientation of the platform 22. Specifically, the sensor 136 may detect whether the platform 22 is in the horizontal position, and a deviation angle of the platform 22 from the horizontal position when the platform 22 is not in the horizontal position. In embodiments, the sensor 136 may be a gyroscope.

Figure 11:
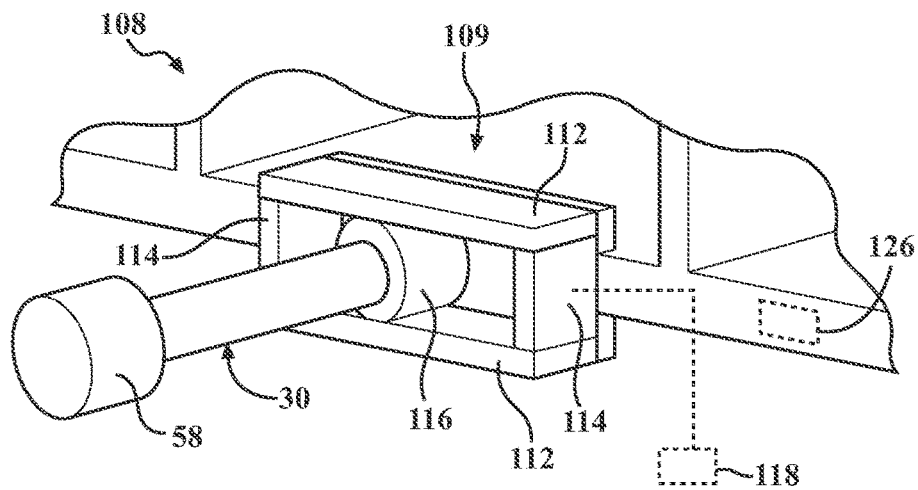
FIG. 11 schematically depicts a partial perspective view of the orientation assembly including the first balancing mechanism of FIG. 10 in an adjustable position, according to one or more embodiments shown and described herein.
Figure 12:
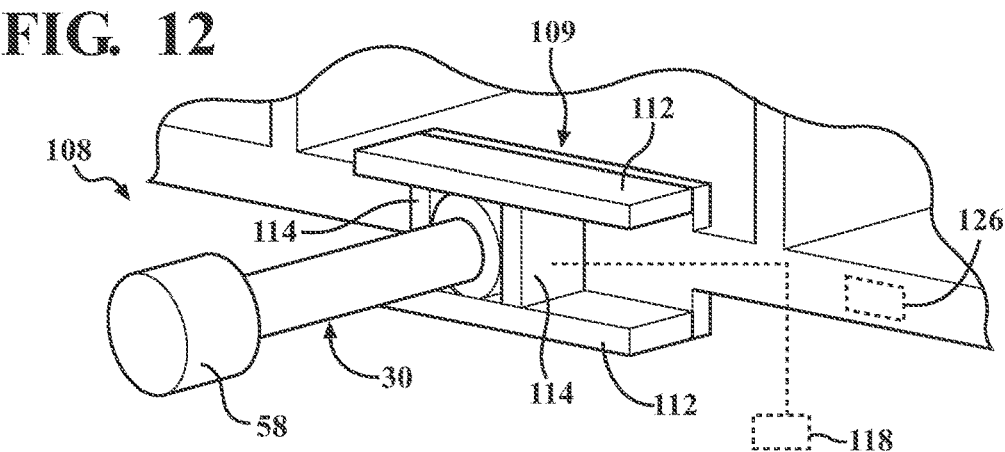
FIG. 12 schematically depicts a partial perspective view of the orientation assembly including the first balancing mechanism of FIG. 10 in a locked position, according to one or more embodiments shown and described herein.

Referring to FIG. 11, the first balancing mechanism 109 is depicted in the adjustable position with the pair of adjustable walls 114 spaced apart from the bearing 116 on the lateral shaft 30, allowing for the lateral shaft 30 to move in the longitudinal direction. Referring to FIG. 12, the first balancing mechanism 109 is depicted in the locked position with the pair of adjustable walls 114 in contact with the bearing 116 to restrict movement of the lateral shaft 30 in the longitudinal direction.

Figure 14:
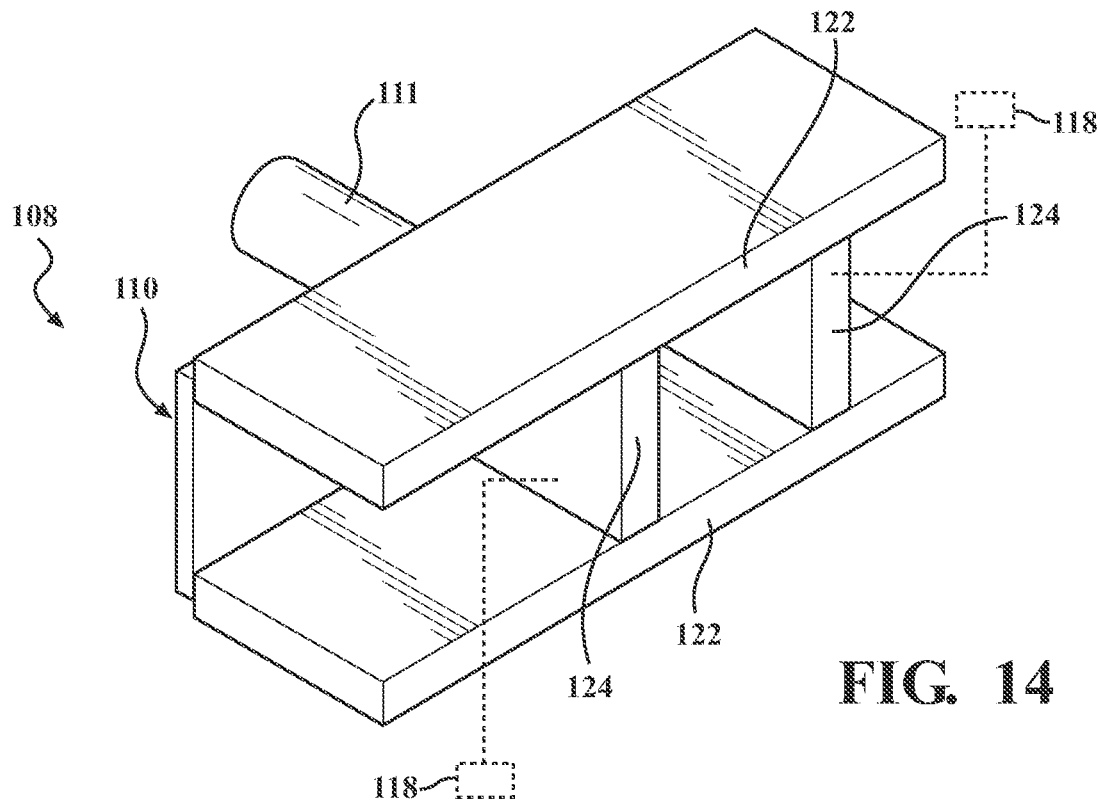
FIG. 14 schematically depicts a perspective view of the second balancing mechanism in a locked position, according to one or more embodiments shown and described herein.

Referring now to FIGS. 13 and 14, the second balancing mechanism 110 may include a pair of tracks 122 extending parallel to the longitudinal direction, and a pair of adjustable walls 124 extending perpendicular to the pair of tracks 122. The pair of adjustable walls 124 may be independently movable relative to each other in the longitudinal direction. The pair of adjustable walls 124 may be coupled to the balancing actuator 118 (FIG. 10), where the balancing actuator 118 moves the pair of adjustable walls 124 similarly to the pair of adjustable walls 114 of the first balancing mechanism 109. The balancing actuator 118 may be a linear actuator configured to linearly displace the adjustable walls 124. The balancing actuator 118 may transfer motion to each of the pair of adjustable walls 124 through a transfer mechanism, such as a set of gears, pulleys, or the like, so that a single actuator may be used to move both the pair of adjustable walls 124. Alternatively, the balancing actuator 118 may include two balancing actuators 118, with one of the balancing actuators 118 being coupled to one of the adjustable walls 124, and the other of the balancing actuators 118 being coupled to the other of the adjustable walls 124. The pair of tracks 122 may be configured to receive the bearing 58 from one of the lateral shaft 30 and the longitudinal shaft 34, such that the lateral shaft 30 may move in the longitudinal direction (e.g., in the +/−X direction) along the pair of tracks 122, or that the longitudinal shaft 34 may move in the lateral direction (e.g., in the +/−Z direction).

The second balancing mechanism 110 may be coupled to an end of one of the pistons, such as, for example, the piston 74, and may receive the corresponding bearing 58 coupled to one of the lateral shaft 30 and the longitudinal shaft 34. The second balancing mechanism 110 is positioned opposite the first balancing mechanism 109. The second balancing mechanism 110 may engage the first bearing 58 at the end of the lateral shaft 30 opposite the first balancing mechanism 109, such that the lateral shaft 30 may extend substantially in the lateral direction. It should be appreciated that, in embodiments where the first balancing mechanism 109 is positioned on the front end 56 and/or the rear end 57 of the platform 22, the second balancing mechanism 110 may be positioned in the interior compartment 16 opposite the first balancing mechanism 109.

Referring to FIG. 13, the second balancing mechanism 110 is depicted in the adjustable position. In the adjustable position, the second balancing mechanism 110 is configured to receive the lateral shaft 30, and allow the lateral shaft 30 to move between the pair of tracks 122 in the longitudinal direction. Referring to FIG. 14, the second balancing mechanism 110 is depicted in the locked position. In the locked position, the second balancing mechanism 110 is configured to maintain the lateral shaft 30 in a fixed position.

Referring now to FIG. 15, a communication path 130 may communicatively couple the controller 28 to the lateral locking actuator 73, the longitudinal locking actuator 93, the balancing actuator 118, and the sensor 136. In embodiments where the counterweight 104 is movably coupled to the platform 22, and an actuator is configured to move the counterweight 104, the controller 28 may be communicatively coupled to the actuator via the communication path 130. It is noted that the orientation assembly 20 may have a greater or fewer number of components communicatively coupled to one another without departing from the scope of the present disclosure.

The communication path 130 provides data interconnectivity between various modules that form part of the orientation assembly 20. Specifically, each of the modules can operate as a node that may send and/or receive data. In some embodiments, the communication path 130 includes a conductive material that permits the transmission of electrical data signals to and between processors, memories, sensors, valves, pumps, etc., throughout the orientation assembly 20. In another embodiment, the communication path 130 may be a bus. In further embodiments, the communication path 130 may be wireless and/or an optical waveguide. Components that are communicatively coupled may include components capable of exchanging data signals with one another such as, for example, electrical signals via conductive medium, electromagnetic signals via air, optical signals via optical waveguides, and the like. Accordingly, the various components may be communicatively coupled via wired or wireless technology (e.g., Bluetooth, cellular, etc.).

The controller 28 is an electronic control unit configured to selectively operate components of the orientation assembly 20 in response to receiving a signal indicative of the flight operation of the vehicle 10. For example, the controller 28 may control the lateral locking actuator 73 and the longitudinal locking actuator 93 for selectively moving the orientation assembly 20 between the horizontal flight configuration and the vertical flight configuration. Specifically, the controller 28 may be configured to position the lateral locking mechanism 24 in the engaged position and the longitudinal locking mechanism 26 in the disengaged position in response to receiving a first signal indicating that a take-off/landing operation is being performed, thereby detecting that the vehicle 10 is performing a vertical flight operation. The controller 28 may additionally be configured to position the lateral locking mechanism 24 in the disengaged position and the longitudinal locking mechanism 26 in the engaged position in response to receiving a second signal indicating that a horizontal flight operation is being performed. The controller 28 may control the balancing actuator 118 to move the balancing assembly 108 between the locked position and the adjustable position. For example, the controller 28 may include one or more processors 132 and one or more memory modules 134 communicatively coupled to the one or more processors 132 via the communication path 130. The one or more processors 132 may include any device capable of executing machine-readable instructions stored on a non-transitory computer-readable medium. Accordingly, each processor 132 may include an integrated circuit, a microchip, a computer, and/or any other computing device. It is noted that the one or more processors 132 may reside within the orientation assembly 20 and/or external to the orientation assembly 20.

As noted above, the one or more memory modules 134 are communicatively coupled to the one or more processors 132 over the communication path 130. The one or more memory modules 134 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the orientation assembly 20 and/or external to the orientation assembly 20. The one or more memory modules 134 may be configured to store one or more pieces of logic to move the orientation assembly 20 between the open position and the closed position.

Embodiments of the present disclosure include logic stored on the one or more memory modules 134 that includes machine-readable instructions and/or an algorithm written in any programming language of any generation (e.g., 1GL, 2GL, 3GL, 4GL, and/or 5GL) such as machine language that may be directly executed by the one or more processors 132, assembly language, obstacle-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. Logic stored on the one or more memory modules 134 allows the controller 28 to, for example, detect the orientation of the vehicle 10, and operate the orientation assembly 20 in response to the detected orientation to change the orientation assembly 20 between the vertical flight configuration and the horizontal flight configuration.

Still referring to FIG. 15, the orientation assembly 20 may include the sensor 126 and/or one or more input devices 138 communicatively coupled to the controller 28 via the communication path 130 for indicating an orientation of the vehicle 10. In embodiments, the sensor 126, which may include a gyroscope or the like, may determine an orientation, e.g., vertical or horizontal, of the vehicle 10. Alternatively or in addition thereto, the one or more input devices 138 may include any device capable of transforming mechanical, optical, audible, or electrical signals into a data signal capable of being transmitted with the communication path 130 for allowing manual entry of an orientation of the vehicle 10. Specifically, an input device 138 may include any number of movable objects that transform physical motion into a data signal that can be transmitted over the communication path 130 such as, for example, a joystick, a button, a keyboard, a switch, a knob, a microphone, a touch screen (e.g., such as of a mobile device or smart phone), or the like. For example, an occupant may operate the one or more input devices 138 to select a desired flight configuration (e.g., horizontal flight configuration or vertical flight configuration) for operating the orientation assembly 20.

The controller 28 may control operation of the balancing actuator 118 in response to signals received from the sensor 136. Specifically, the controller 28 may receive a signal from the sensor 136 indicating that the platform 22 is not in the horizontal position. In response to receiving the signal, the controller 28 may actuate the balancing actuator 118 to move the pair of adjustable walls 114, thereby moving the lateral shaft 30 in the longitudinal direction. By moving the lateral shaft 30 in the longitudinal direction, the lateral axis 32 by which the platform 22 rotates about is moved longitudinally. The adjustment of the lateral axis 32 may adjust the axis of rotation to a point below a center of mass placed on the platform 22 to maintain the platform 22 in the horizontal position.

Figure 16:
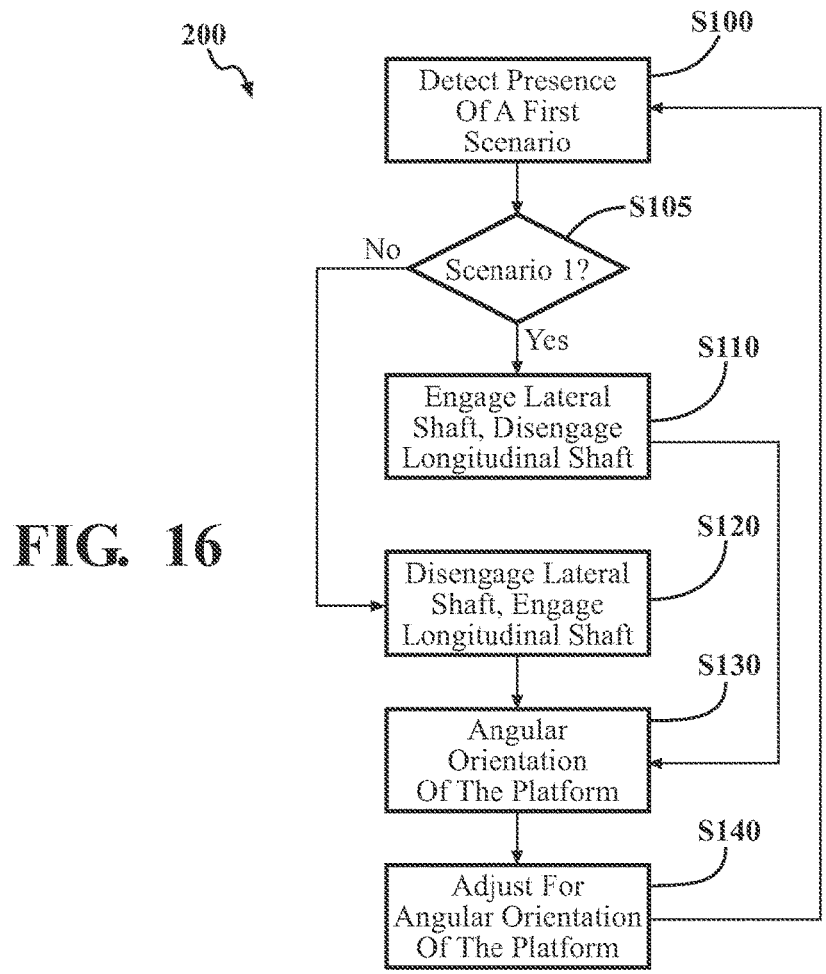
FIG. 16 schematically depicts a flow chart depicting a method of operating the orientation assembly of FIG. 1, according to one or more embodiments shown and described herein.

Referring now to FIG. 16, a flowchart depicting a method 200 of controlling the orientation assembly 20 with the controller 28 is described. It is noted that though a particular number of steps are depicted in a particular order, a greater or fewer number of steps may be included, in any order, without departing from the scope of the present disclosure. At step S100, the controller 28 detects the presence of either a first scenario in which the vehicle 10 is in the vertical flight position such that the vehicle 10 is performing a take-off or landing operation, or a second scenario in which the vehicle 10 is in the horizontal flight position such that the vehicle 10 is not performing a take-off or landing operation. The controller 28 may detect whether the vehicle 10 is in the vertical flight position or the horizontal flight position via the sensor 126 (FIG. 15), such as a gyroscope that senses the orientation of the vehicle 10, or via a user input that sends a signal to the controller 28 indicative of the flight position of the vehicle 10.

At step S105, the controller 28 determines whether the first scenario is present. If the controller 28 determines that the first scenario is present, such that the vehicle 10 is in the vertical flight position, the method 200 proceeds to step S110. If the controller 28 determines that the first scenario is not present, such that the vehicle 10 is in the horizontal flight position, the method 200 proceeds to step S120.

In response to determining that the first scenario is present at step S105, the method 200 proceeds to step S110. At step S110, the controller 28 positions the lateral locking mechanism 24 into the engaged position to engage the lateral shaft 30 of the platform 22 and positions the longitudinal locking mechanism 26 into the disengaged position to disengage the longitudinal shaft 34 of the platform 22. Detecting the first scenario comprises receiving a first signal from the controller 28 of the vehicle 10 indicating that the vertical flight operation is being performed. Positioning the lateral locking mechanism 24 into the engaged position comprises extending a pair of lateral locking members 70, 72 from the vehicle body 12 of the vehicle 10, each of the pair of lateral locking members 70, 72 including the receiver 76, 82 for receiving a corresponding end of the lateral shaft 30. Positioning the longitudinal locking mechanism 26 into the disengaged position comprises retracting the pair of longitudinal locking members 90, 92 from the vehicle body 12 of the vehicle 10 such that each receiver 96, 100 disengages the corresponding end of the longitudinal shaft 34. Accordingly, the platform 22 and the seat 23 are permitted to rotate about the lateral axis 32 during pitch movement of the vehicle 10, but fixed about the longitudinal axis 36.

In response to determining that the second scenario is present at step S105, the method 200 proceeds to step S120. At step S120, the controller 28 positions the lateral locking mechanism 24 into the disengaged position to disengage the lateral shaft 30 of the platform 22 and positions the longitudinal locking mechanism 26 into the engaged position to engage the longitudinal shaft 34 of the platform 22. Detecting the second scenario comprises receiving a second signal from the controller 28 of the vehicle 10 indicating that the horizontal flight operation is being performed. Positioning the lateral locking mechanism 24 into the disengaged position comprises retracting the pair of lateral locking members 70, 72 from the vehicle body 12 of the vehicle 10 such that each receiver 76, 82 disengages the corresponding end of the lateral shaft 30. Positioning the longitudinal locking mechanism 26 into the engaged position comprises extending the pair of longitudinal locking members 90, 92 from the vehicle body 12 of the vehicle 10, each of the pair of longitudinal locking members 90, 92 including the receiver 96, 100 for receiving a corresponding end of the longitudinal shaft 34. Accordingly, the platform 22 and the seat 23 is permitted to rotate about the longitudinal axis 36 during roll movement of the vehicle 10, but fixed about the lateral axis 32.

Following either step S110 or S120, the method 200 proceeds to step S130. At step S130, the method 200 may include detecting the angular orientation of the platform 22 based on a signal from the sensor 136. The controller 28 may determine whether the platform 22 is in the horizontal position based on an angular deviation of the platform 22 from a baseline angle. After the controller 28 determines the angular orientation of the platform 22, the method 200 may proceed to step S140. At step S140, in response to determining that the platform 22 is offset from the horizontal position by an angle exceeding a threshold deviation angle, such as more weight being provided on the seat 23 in front of or behind the lateral axis 32, in embodiments, the balancing actuator 118 may actuate the pair of adjustable walls 114 of the first balancing mechanism 109 and the pair of adjustable walls 124 of the second balancing mechanism 110 to adjust the position of the lateral shaft 30, when the vehicle 10 is in the vertical flight orientation, thereby moving the platform 22 toward the horizontal position. In other embodiments, the controller 28 may adjust the position of the counterweight 104 via the actuator to shift the center of gravity. When the vehicle 10 is in the horizontal flight orientation, similar balancing mechanisms may be provided for adjusting the position of the longitudinal shaft 34 in the lateral direction. After adjusting the first balancing mechanism 109 and the second balancing mechanism 110 to account for a modified center of gravity on the platform 22, the method 200 may return to step S100 to continue monitoring for changes in flight orientation of the vehicle 10.

From the above, it is to be appreciated that defined herein is an orientation assembly for a vehicle that includes a platform, a lateral locking mechanism, and a longitudinal locking mechanism. The platform includes a lateral shaft and a longitudinal shaft. The lateral locking mechanism may engage the lateral shaft to allow the platform to rotate about an axis extending along the lateral shaft. The longitudinal locking mechanism may engage the longitudinal shaft to allow the platform to rotate about an axis extending along the longitudinal shaft. The lateral locking mechanism and the longitudinal locking mechanism may be positioned between engaged and disengaged positions based on the orientation of the vehicle to maintain the platform in a horizontal position.

It is noted that the term "substantially" may be utilized herein to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An orientation assembly comprising:
   a platform comprising:
      a lateral shaft defining a lateral axis; and
      a longitudinal shaft defining a longitudinal axis; and
   a locking assembly engageable with the platform and positionable in a first state in which the platform is permitted to rotate about the lateral axis and inhibited from rotating about the longitudinal axis perpendicular to the lateral axis, and a second state in which the platform is permitted to rotate about the longitudinal axis and inhibited from rotating about the lateral axis, the locking assembly comprising:
      a lateral locking mechanism positionable between an engaged position and a disengaged position, the lateral locking mechanism engaging the lateral shaft when in the engaged position, and disengaging the lateral shaft when in the disengaged position; and
      a longitudinal locking mechanism positionable between an engaged position and a disengaged position, the longitudinal locking mechanism engaging the longitudinal shaft when in the engaged position, and disengaging the longitudinal shaft when in the disengaged position,
   wherein at least one of the lateral locking mechanism and the longitudinal locking mechanism includes a first locking member and a second locking member, the first locking member and the second locking member each include a piston and a receiver formed at a free end of the piston, the piston of the first locking member and the second locking member retracted when the at least one of the lateral locking mechanism and the longitudinal locking mechanism is in the disengaged position and extended when the at least one of the lateral locking mechanism and the longitudinal locking mechanism is in the engaged position.

2. The orientation assembly of claim 1, wherein:
   when the locking assembly is in the first state, the lateral locking mechanism is in the engaged position and the longitudinal locking mechanism is in the disengaged position;
   when the locking assembly is in the second state, the lateral locking mechanism is in the disengaged position and the longitudinal locking mechanism is in the engaged position; and when the locking assembly is in a third state, the lateral locking mechanism is in the engaged position and the longitudinal locking mechanism is in the engaged position.

3. The orientation assembly of claim 2, wherein:
the lateral shaft comprises a first end and an opposite second end, the lateral locking mechanism engages the first end and the second end of the lateral shaft when in the engaged position, and disengages the first end and the second end of the lateral shaft when in the disengaged position, and the longitudinal shaft comprises a front end and an opposite rear end, the longitudinal locking mechanism engages the front end and the rear end of the longitudinal shaft when in the engaged position, and disengages the front end and the rear end of the longitudinal shaft when in the disengaged position.

4. The orientation assembly of claim 3, wherein:
the lateral shaft extends from a first side edge of the platform and an opposite second side edge of the platform, and
the longitudinal shaft extends from a front side of the platform and an opposite rear side of the platform.

5. The orientation assembly of claim 3, wherein a first bearing is provided at the first end of the lateral shaft and a second bearing is provided at the second end of the lateral shaft.

6. The orientation assembly of claim 3, wherein a first bearing is provided at the front end of the longitudinal shaft and a second bearing is provided at the rear end of the longitudinal shaft.

7. The orientation assembly of claim 2, further comprising a balancing assembly comprising:
a pair of tracks;
a pair of adjustable walls movable along the pair of tracks; and
a balancing actuator coupled to the pair of adjustable walls, the balancing actuator being configured to move the balancing assembly between an adjustable position and a locked position,
wherein, when in the adjustable position, the lateral shaft is permitted to move between the pair of adjustable walls, and
wherein, when in the locked position, the lateral shaft is restricted from moving between the pair of adjustable walls.

8. The orientation assembly of claim 1, wherein the lateral locking mechanism includes the first locking member and the second locking member.

9. The orientation assembly of claim 1, wherein each of the lateral locking mechanism and the longitudinal locking mechanism each include a first locking member and a second locking member.

10. An orientation assembly comprising:
a platform;
a locking assembly engageable with the platform and positionable in a first state in which the platform is permitted to rotate about a lateral axis and inhibited from rotating about a longitudinal axis perpendicular to the lateral axis, and a second state in which the platform is permitted to rotate about the longitudinal axis and inhibited from rotating about the lateral axis;
a sensor for detecting a first scenario in which a vehicle is in a vertical flight position, and a second scenario in which the vehicle is in a horizontal flight position; and
a controller configured to:
in response to the sensor detecting the first scenario, position positioning the locking assembly into the first state in response to receiving an input from a sensor that a vehicle is in a vertical flight position; and
in response to the sensor detecting the second scenario, position positioning the locking assembly into the second state.

11. The orientation assembly of claim 10, wherein:
the platform comprises:
a lateral shaft defining the lateral axis about which the platform rotates; and
a longitudinal shaft defining the longitudinal axis about which the platform rotates,
the longitudinal axis being perpendicular to the lateral axis;
the locking assembly comprises:
a lateral locking mechanism positionable between an engaged position and a disengaged position, the lateral locking mechanism engaging the lateral shaft when in the engaged position, and disengaging the lateral shaft when in the disengaged position; and
a longitudinal locking mechanism positionable between an engaged position and a disengaged position, the longitudinal locking mechanism engaging the longitudinal shaft when in the engaged position, and disengaging the longitudinal shaft when in the disengaged position,
when the locking assembly is in the first state, the lateral locking mechanism is in the engaged position and the longitudinal locking mechanism is in the disengaged position;
when the locking assembly is in the second state, the lateral locking mechanism is in the disengaged position and the longitudinal locking mechanism is in the engaged position; and
when the locking assembly is in a third state, the lateral locking mechanism is in the engaged position and the longitudinal locking mechanism is in the engaged position.

12. The orientation assembly of claim 11, wherein positioning the lateral locking mechanism into the engaged position comprises extending a pair of lateral locking members, each of the pair of lateral locking members including a receiver for receiving a corresponding end of the lateral shaft, and wherein positioning the lateral locking mechanism into the disengaged position comprises retracting the pair of lateral locking members such that each receiver disengages the corresponding end of the lateral shaft.

13. The orientation assembly of claim 12, wherein positioning the longitudinal locking mechanism into the engaged position comprises extending a pair of longitudinal locking members, each of the pair of longitudinal locking members including a receiver for receiving a corresponding end of the longitudinal shaft, and wherein positioning the longitudinal locking mechanism into the disengaged position comprises retracting the pair of longitudinal locking members such that each receiver disengages the corresponding end of the longitudinal shaft.

14. A vehicle comprising:
a vehicle body defining an interior compartment;
a platform provided within the interior compartment of the vehicle body, the platform comprising:
a lateral shaft defining a lateral axis; and
a longitudinal shaft defining a longitudinal axis;
a locking assembly engageable with the platform and positionable in a first state in which the platform is permitted to rotate about the lateral axis and inhibited from rotating about the longitudinal axis perpendicular to the lateral axis, and a second state in which the platform is permitted to rotate about the longitudinal axis and inhibited from rotating about the lateral axis; and a balancing assembly comprising:
  a pair of tracks;
  a pair of adjustable walls movable along the pair of tracks; and
  a balancing actuator coupled to the pair of adjustable walls, the balancing actuator being configured to move the balancing assembly between an adjustable position and a locked position, wherein, when in the adjustable position, at least one of the lateral shaft and the longitudinal shaft is permitted to move between the pair of adjustable walls, and wherein, when in the locked position, the at least one of the lateral shaft and the longitudinal shaft is restricted from moving between the pair of adjustable walls.

15. The vehicle of claim 14, wherein:
the locking assembly comprises:
  a lateral locking mechanism coupled to the vehicle body and positionable between an engaged position and a disengaged position, the lateral locking mechanism engaging the lateral shaft when in the engaged position, and disengaging the lateral shaft when in the disengaged position; and
  a longitudinal locking mechanism coupled to the vehicle body and positionable between an engaged position and a disengaged position, the longitudinal locking mechanism engaging the longitudinal shaft when in the engaged position, and disengaging the longitudinal shaft when in the disengaged position.

16. The vehicle of claim 15, wherein when the lateral locking mechanism is in the engaged position and the longitudinal locking mechanism is in the disengaged position, rotation of the platform is restricted to the lateral axis.

17. The vehicle of claim 15, wherein when the lateral locking mechanism is in the disengaged position and the longitudinal locking mechanism is in the engaged position, rotation of the platform is restricted to the longitudinal axis.

18. The vehicle of claim 15, wherein:
the lateral shaft comprises a first end and an opposite second end, the lateral locking mechanism engages the first end and the second end of the lateral shaft when in the engaged position, and disengages the first end and the second end of the lateral shaft when in the disengaged position, and the longitudinal shaft comprises a front end and an opposite rear end, the longitudinal locking mechanism engages the front end and the rear end of the longitudinal shaft when in the engaged position, and disengages the front end and the rear end of the longitudinal shaft when in the disengaged position.

19. The vehicle of claim 14, wherein:
when in the adjustable position, the lateral shaft is permitted to move between the pair of adjustable walls; and
when in the locked position, the lateral shaft is restricted from moving between the pair of adjustable walls.

20. The vehicle of claim 14, wherein:
when in the adjustable position, each of the lateral shaft and the longitudinal shaft is permitted to move between a pair of adjustable walls; and
when in the locked position, each of the lateral shaft and the longitudinal shaft is restricted from moving between a pair of adjustable walls.

* * * * *